(12) United States Patent
Zbylut

(10) Patent No.: US 12,090,972 B2
(45) Date of Patent: Sep. 17, 2024

(54) SPRING BRAKE ACTUATOR

(71) Applicant: ZF CV Systems Europe BV, Brussels (BE)

(72) Inventor: Michal Zbylut, Wroclaw (PL)

(73) Assignee: ZF CV Systems Europe BV, Brussels (BE)

( * ) Notice: Subject to any disclaimer, the term of this patent is extended or adjusted under 35 U.S.C. 154(b) by 119 days.

(21) Appl. No.: 17/737,161

(22) Filed: May 5, 2022

(65) Prior Publication Data

US 2022/0355775 A1 Nov. 10, 2022

(30) Foreign Application Priority Data

May 6, 2021 (EP) .................................... 21172409

(51) Int. Cl.
*B60T 13/38* (2006.01)
*F16D 65/28* (2006.01)

(52) U.S. Cl.
CPC .............. *B60T 13/38* (2013.01); *F16D 65/28* (2013.01)

(58) Field of Classification Search
CPC ...... B60T 13/38; B60T 17/085; B60T 17/088; B60T 17/081; B60T 17/083; B60T 17/18; B60T 11/236; F16D 2121/10; F16D 2125/08; Y10T 29/49826
USPC ....................................................... 188/170
See application file for complete search history.

(56) References Cited

U.S. PATENT DOCUMENTS

| | | | |
|---|---|---|---|
| 3,712,181 A * | 1/1973 | Swander, Jr. ......... | B60T 17/083 188/170 |
| 3,926,094 A * | 12/1975 | Kurichh ................ | B60T 17/083 188/170 |
| 4,887,513 A | 12/1989 | Ewald et al. | |
| 5,016,523 A * | 5/1991 | Bowyer ................ | B60T 17/083 92/146 |

(Continued)

FOREIGN PATENT DOCUMENTS

| CA | 2217245 A1 | 11/1998 |
|---|---|---|
| CA | 2806268 A1 | 9/2013 |
| CN | 102032298 A | 4/2011 |
| CN | 202301649 U | 7/2012 |
| CN | 103306729 A | 9/2013 |
| CN | 103946088 A | 7/2014 |
| CN | 104405800 A | 3/2015 |
| CN | 108944892 A | 12/2018 |

(Continued)

OTHER PUBLICATIONS

English machined translation of description DE-102015115489 A1), Mar. 16, 2017.*

*Primary Examiner* — Robert A. Siconolfi
*Assistant Examiner* — San M Aung
(74) *Attorney, Agent, or Firm* — Dickinson Wright PLLC

(57) ABSTRACT

A spring brake actuator has a combined housing including a first housing, a second housing, and connection part connecting the first housing and the second housing. Gas inlet ports are disposed along the circumference of the combined housing in a gas inlet port section. A mechanical connection section is disposed in the same axial space as the gas inlet portion section. A bayonet connection is arranged in the mechanical connection section, with gas inlet ports disposed between the bayonet elements. Port connectors may extend through recesses or holes and be threaded into the gas inlet ports, and which may block the bayonet connection and block relative rotation between the first and second housings. The connection part may include a ring shaped protrusion form fit with a protruding of the second housing, with the bayonet elements disposed at the opposite end of the connection part engaged with the first housing.

20 Claims, 4 Drawing Sheets

(56) References Cited

U.S. PATENT DOCUMENTS

| | | | | |
|---|---|---|---|---|
| 5,315,918 A * | 5/1994 | Pierce | ............... | B60T 17/083 |
| | | | | 403/348 |
| 5,829,339 A * | 11/1998 | Smith | ................. | F16D 65/28 |
| | | | | 277/540 |
| 6,050,372 A * | 4/2000 | Fisher | ............... | B60T 17/083 |
| | | | | 188/170 |
| 6,588,314 B1 * | 7/2003 | Stojic | ............... | B60T 17/083 |
| | | | | 92/63 |
| 7,025,385 B2 * | 4/2006 | Drescher | ........... | F16L 37/252 |
| | | | | 285/376 |
| 2005/0046186 A1 | 3/2005 | Drescher | | |
| 2014/0305121 A1 * | 10/2014 | Derouault | ......... | B60T 17/083 |
| | | | | 29/428 |
| 2017/0050628 A1 * | 2/2017 | Park | ................... | F16D 65/28 |

FOREIGN PATENT DOCUMENTS

| | | | | |
|---|---|---|---|---|
| CN | 110877603 A | | 3/2020 | |
| CN | 112682440 A | | 4/2021 | |
| DE | 3543365 A | * | 6/1987 | ............ B60T 17/083 |
| DE | 102011115122 A1 | | 4/2013 | |
| DE | 102015115489 A1 | | 3/2017 | |
| EP | 0554050 A1 | | 8/1993 | |
| EP | 3645358 A1 | | 5/2020 | |
| GB | 1126311 A | | 9/1968 | |
| WO | 2008027018 A1 | | 3/2008 | |
| WO | 2013169219 A1 | | 11/2013 | |
| WO | WO-2020194078 A1 | * | 10/2020 | ............ B60T 17/083 |

\* cited by examiner

SPRING BRAKE ACTUATOR

CROSS-REFERENCE TO RELATED APPLICATIONS

This application claims priority to previously filed European Patent Application No. EP21172409.1, filed May 6, 2021, the entire content of which is incorporated by reference in its entirety.

BACKGROUND

The present invention relates to a spring brake actuator, preferably for use in a commercial vehicle, the actuator including a housing for the brake actuator having an interior space for receiving components of the brake actuator, a brake piston located in the housing for generating a braking force and having a longitudinal axis, the housing having a longitudinal axis which coincides with or is parallel to the longitudinal axis of the piston, a spring located in the housing for applying a force to the brake piston, a rod connected with the brake piston for transmitting the braking force, at least one gas inlet port associated with the housing for supplying pressurized gas into the housing and for applying pressure to the brake piston, the housing having a mechanical connection section comprising mechanical connection elements for forming a releasable connection with another housing, preferably for a further brake actuator.

FIELD

Spring brake actuators are used in the commercial vehicle industry to provide a service brake, a parking brake, and/or emergency brake capability. Spring brake actuators are regularly connected to a service brake actuator and often act upon the same brake components which transmit the brake force to the vehicle wheel. Utilizing these two brake types together requires that only one of the brakes is activated at a time.

In known embodiments of spring brakes, a service brake and a parking or emergency brake are combined, each brake part having a housing including a spring brake chamber. The two housings are connected by a bayonet connection. For example, the first housing may include the service brake actuators, and the second housing includes the parking brake actuator. The bayonet connection is typically realized by bayonet projections positioned at an end section of a first housing (e.g. for the service brake actuator), and corresponding bayonet recesses are positioned on an opposing end section of the second housing (e.g. for a parking brake actuator) or vice versa.

The spring brake chambers using bayonet connections require a certain length in the longitudinal direction of the housing, and they are limited for total length reduction of the complete device. The total length of the brake actuator is critical, because the overall space available for the brake actuator is typically limited within the vehicle, in particular commercial vehicles. One reason for the limitation on the total length reduction is that a central component connecting the service part housing and the parking part housing, which central component is often referred to as flange, requires a certain length in the axial (or longitudinal) direction of the housing or piston, because this central component must contain the inlet ports for supplying pressurized air into the housing and chambers. In order to have enough space to connect all parts, such as the inlet ports and the housings, the inlet port sections and the bayonet connection elements are arranged after one another in the longitudinal direction of the housing, which typically coincides with the longitudinal axis of the piston and piston rod connected to the piston. This required space for the inlet ports as well as the mechanical connection elements limits the ability to reduce the length of the complete actuator.

SUMMARY

Thus, it is the object of the invention to provide a spring brake actuator that requires less space, in particular into the longitudinal or axial direction.

The present disclosure attains this object by providing a spring brake actuator wherein the gas inlet port(s) and the mechanical connection section are positioned along the circumference of the housing within the same gas inlet port section of the housing extending in the direction of the longitudinal axis.

In accordance with the invention, the mechanical connection section and the gas inlet ports or gas inlet port area are positioned in the same area for the gas inlet port(s) with respect to the longitudinal axis of the housing, brake piston, and thus the spring brake actuator. Both functionalities are maintained, but the required space in the longitudinal direction is reduced, so that the overall required space or length can be reduced. By positioning the mechanical connection section and the inlet ports in the same area or section of the housing, which is often referred to as a flange, the overall length can be reduced.

Further preferred embodiments and features in accordance with the invention are described in further detail herein.

In accordance with a preferred embodiment, the gas inlet port(s) and the mechanical connection elements are essentially positioned along a circumferential circular line or band along the housing, wherein the longitudinal axis of the housing coincides with the center of the circumferential circular line or band. Thus, both the gas inlet ports and the mechanical connection elements are within the same area along the periphery of the housing, this area extending only in a relatively short dimension in the direction of the longitudinal axis of the housing. This arrangement saves space in the longitudinal direction and results in a reduced overall length of the brake actuator. The axial dimension of this area or section of the housing in accordance with the present disclosure depends on the dimension of the actuator, but can be kept small. For example, this axial dimension can be approximately the size of the diameter of the inlet ports or be slightly larger, for example about a factor of 1.25 times the diameter of the inlet port.

In accordance with a preferred embodiment, the mechanical connection section includes a bayonet connection having a plurality of bayonet connection elements, and the gas inlet port(s) is positioned between bayonet connection elements. The actual length of the mechanical connection section can be kept small when the gas inlet port is positioned between those bayonet connection elements. Preferably, the bayonet connection elements are bayonet projections and that the gas inlet port(s) are positioned between the projections.

In accordance with a further preferred embodiment, the housing includes cylindrical holes or recesses forming the inlet ports, and that the bayonet connection elements are positioned between these holes or recesses.

It is particularly preferred if a port connector for introducing pressurized gas is connected with an inlet port formed in the housing and protrudes radially from the housing. The port connector preferably extends through the hole or recess of the housing and can easily be connected to the further pressurized gas line.

In accordance with a further preferred embodiment, the port connector, in the mounted position, extends through a recess or hole formed in a first housing and is attached in fluid communication with an inlet port communicating with the brake piston, so that the first housing and a second housing cannot be rotated with respect to each other around the longitudinal axis and so that the bayonet connection is blocked. The port connector thus has a double function: for allowing a good connection to the pressurized gas source, and also for blocking the bayonet connection, so that the two housings are coupled reliably to each other. Also, and incorrect assembly can be avoided. The bayonet connection can be prevented from being connected in a wrong position, and the two housings can avoid being disconnected by accident or inadvertently.

Preferably, a reliable but relatively simply mechanical connection can be achieved in that the port connector has an outer thread and is screwed into the inlet port having an inner thread.

It is further preferred that the inlet port(s) are formed on a protruding portion of the first housing extending radially outwardly, and that the bayonet elements are positioned between protruding housing portions. The protruding portion of one housing may have a section referred to as a flange, and can be integrated into that housing section.

In accordance with another preferred embodiment, the bayonet elements on one housing, or a connection section attached to the housing, are formed as projections and the bayonet elements on the other housing are formed as depressions extending essentially along the circumferential direction with respect to the longitudinal axis.

Furthermore, it is preferred that the first housing is connected with the second housing for a second brake actuator by the bayonet connection elements, via the connection portion in one aspect, and that the bayonet connection elements are projections formed in one of the first housing and/or the second housing, or the connection portion, and recesses formed in the other of the second housing and/or first housing, or the connection portion.

Further, in another preferred embodiment the first housing comprises an essentially cylindrical shape, and the recesses of the bayonet section are formed in a cylindrical end section having a larger diameter than the adjacent section of the first housing. The two housings can be coupled easily in this way.

The advantages of the present disclosure can particularly be achieved if the second housing includes elements of a service brake including at least a spring, and the first housing includes elements of a park brake including a brake piston, a spring, and/or a release bolt.

For a more complete understanding of the invention, the invention is described in detail with reference to the accompanying drawing. The detailed description illustrates and describes what is considered as a preferred embodiment of the invention. It should of course be understood that various modifications and changes in form or detail could readily be made without departing from the spirit of the invention. It is therefore intended that the invention may not be limited to the exact form and detail shown and described herein, nor to anything less than the whole of the invention disclosed herein and as claimed hereinafter. Further, the features described in the description, the drawings, and the claims disclosing the invention may be essential for the invention considered alone or in combination. In particular, any reference signs in the claims shall not be construed as limiting the scope of the invention. The wording "comprising" does not exclude other elements or steps. The wording "a" or "an" does not exclude a plurality.

BRIEF DESCRIPTION

This present disclosure will now be described with reference to the accompanying drawings which illustrate, by way of example and not by way of limitation, one of several possible embodiments of the spring brake actuator described herein, in which.

DETAILED DESCRIPTION

Figure 1:
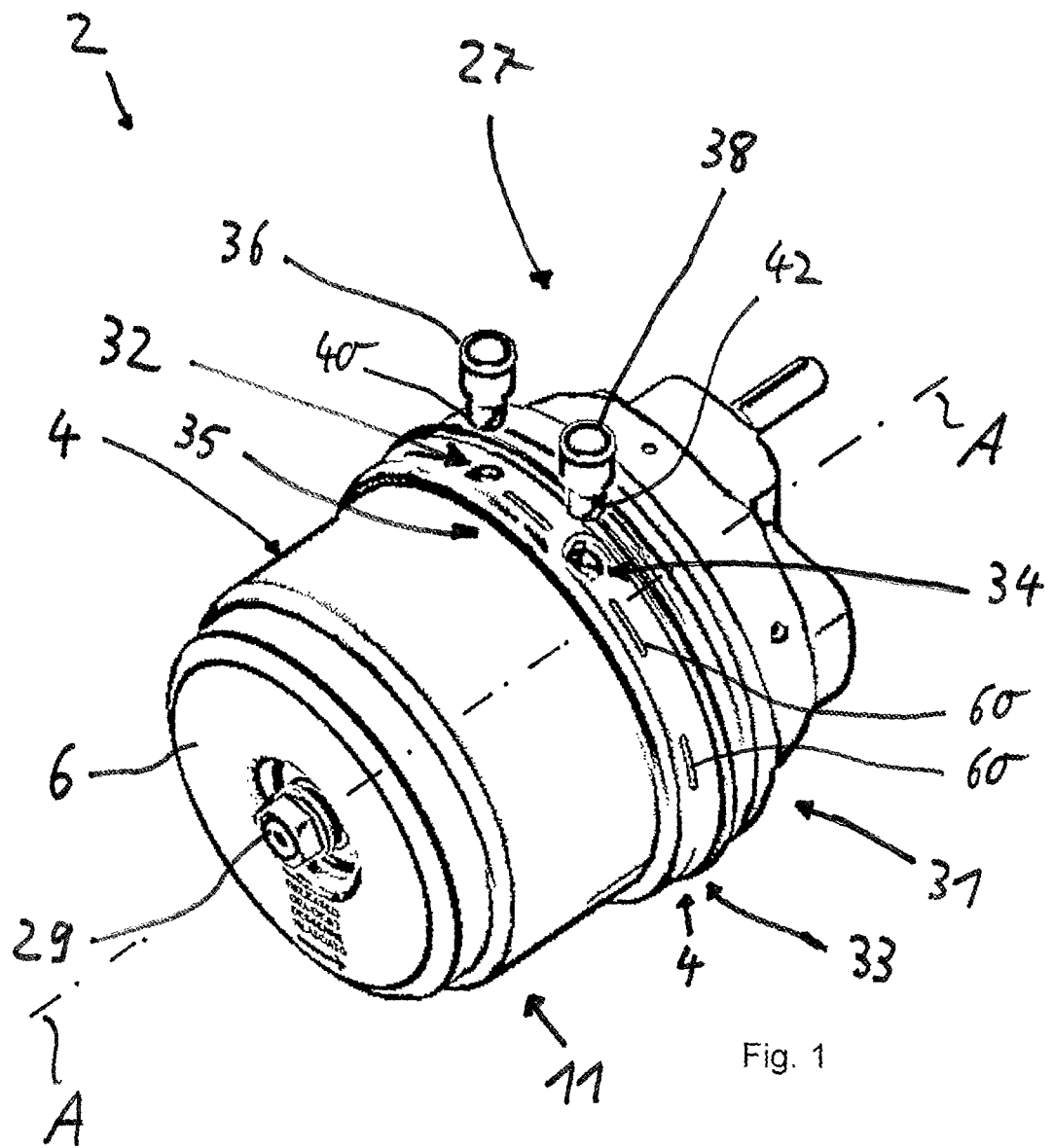
FIG. 1 is a perspective view of a spring brake actuator according to an aspect of the disclosure.
Figure 3:
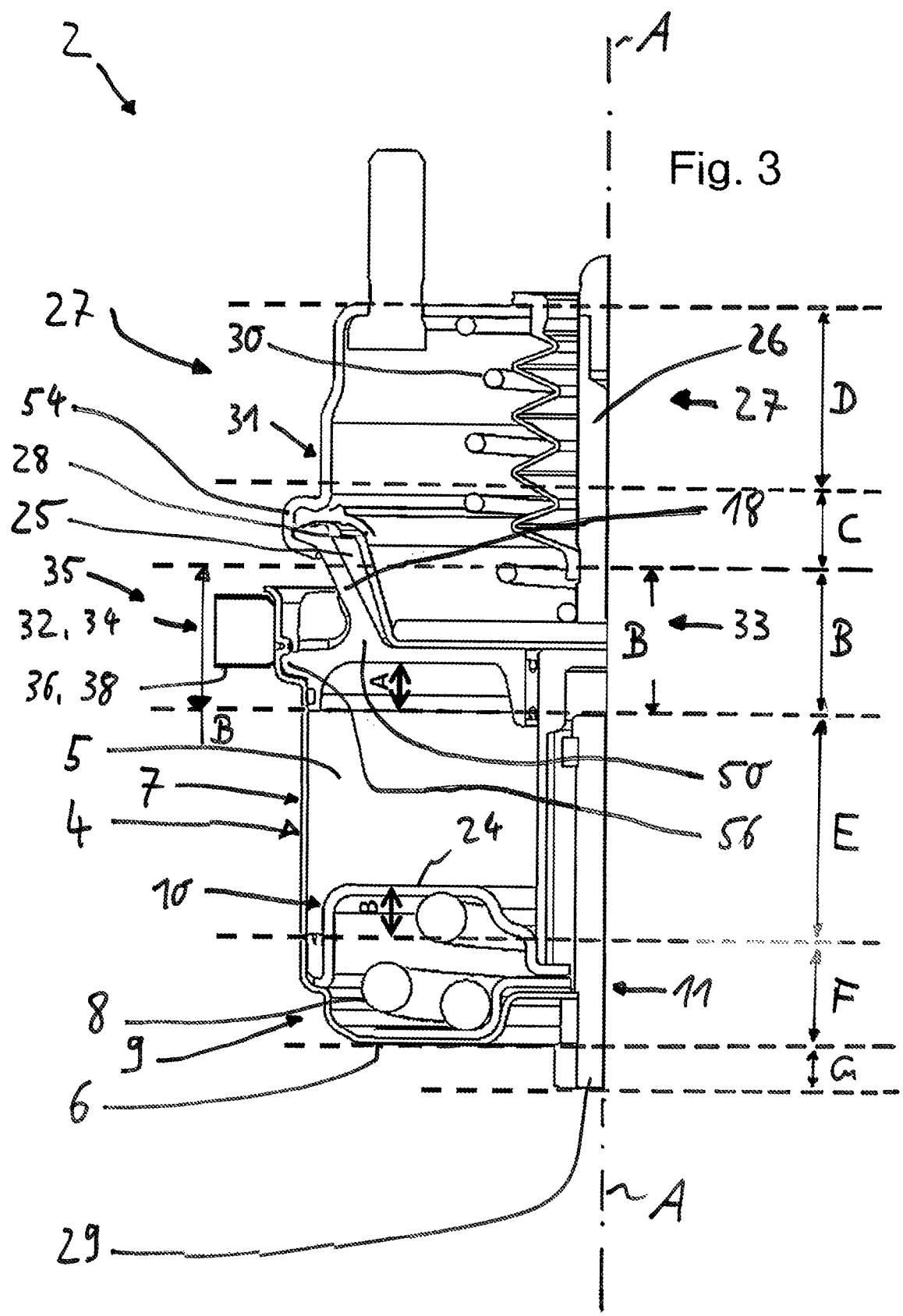
FIG. 3 is a cross-sectional view of the spring brake actuator of FIG. 1.

FIG. 1 shows a perspective view and FIG. 3 a cross-sectional schematic view of a spring brake actuator 2. The spring brake actuator 2 comprises a cylindrical or cylinder first housing 4, preferably of a parking brake section 11 of the brake actuator 2. The first housing 4 for the brake actuator has an interior space for receiving components of the brake actuator 2. Inside the housing 4, as shown in FIG. 3, a compression spring 8 and a pressure chamber 5 are arranged. The pressure chamber 5 defines the parking stroke area 7 of the parking brake section in the shown embodiment. The compression spring 8 is positioned within a parking spring area 9 and rests on the lower side of FIG. 1 or FIG. 3 against a cylinder housing base 6 and on the opposite side on a spring brake piston 10. The spring brake piston 10 is, in FIG. 1, held in a brake release position by a positive pressure inside the pressure chamber 5. The brake piston 10 has a longitudinal axis A. The housing 4 also has a longitudinal axis A which coincides with—or is parallel to—the longitudinal axis A of the piston 10.

The spring brake piston 10 is adapted to act upon a diaphragm 24 of the spring brake actuator 2 which transmits the inflicted force to a rod 26 which, in turn, transmits the applied power to the wheel brakes (not shown). The spring brake actuator 2 furthermore comprises a release bolt 29. The release bolt 29 is utilized to release the spring brake actuator 2 in case of malfunctions, for example.

The spring brake actuator 2 moreover comprises a service brake 27 (or service brake section), as shown in FIG. 1 and FIG. 3. A flange portion 18, which may be considered a housing or part of the combined housing of the actuator 2, is utilized to connect the service brake section 27 to the parking brake section 11. The service brake 27 has a second housing 31, which is the second housing with respect to the first housing 4 of the lower section of the spring brake actuator 2. The service brake 27 comprises a service brake pressure chamber 25 (FIG. 3), into which a pressure may be built up to generate a force upon the service diaphragm 28 which transmits the inflicted force to the rod 26. The second housing 31 thus includes elements of a service brake 27 including at least a service brake spring 30, and the first housing 4 includes elements of a park brake including a brake piston 10, a spring 8, and/or a release bolt 29.

In case both the spring brake actuator 2 of the parking brake section 11 and the service brake 27 are operated simultaneously, pressure is released from the service brake pressure chamber 25. With the help of this arrangement, whenever the spring brake actuator 2 of the parking brake section 11 and the service brake 27 are operated simultaneously, the braking forces of the two brake sections adding up and damaging the rod 26 or parts of the wheel brakes is avoided.

In the illustrated embodiment, the first housing 4 and the second housing 31 form the combined housing of the illustrated spring brake actuator 2. A mechanical connection section 33 is designed and adapted to connect housing 4 and housing 31 mechanically. Also, gas inlet ports 32, 34 for introducing pressurized gas, in particular pressurized air into the housing 4, 31 to actuate the brake actuator 2, in particular the parking brake section 11 and the service brake 27 of the actuator 2, are provided in the area of the mechanical connection section 33. This area thus also forms a gas inlet port section 35 of the housing. The gas inlet port(s) 32, 34 and the mechanical connection section 33 are positioned along the circumference of the housing 4, 31 within the gas inlet port section 35 of the combined housing extending into the direction of the longitudinal axis (A). Because both the gas inlet ports 32, 34, of the gas inlet port section 35 as well as the mechanical connection section 33 are positioned at the same longitudinal area, only a relatively small section or length B, illustrated in FIG. 2 and FIG. 3, in the axial direction along the longitudinal axis A, is required in accordance with the preferred embodiment, so that the overall axial length of the brake actuator 2 is relatively small, and smaller compared to the known brake actuators. The length B can be kept short, because both the mechanical connection section 33 as well as the gas inlet port section 35 are positioned in the same axial and longitudinal area. These sections 33, 35 also both extend along the circumference of the combined housing of the spring brake actuator 2.

As can be seen from FIGS. 1 through 4, gas inlet ports 32, 34 for supplying pressurized gas into the combined housing 4, 31 and for applying pressure to the brake piston(s) 10 are associated with the combined housing 4, 31, 50. Preferably, each gas inlet port 32, 34 comprises a port connector 36, 38 for introducing pressurized gas into the inlet port 32, 34 formed within the combined housing 4, 31, 50 and which protrude radially from the combined housing 4, 31, 50 with respect to the longitudinal axis A. For example, a pressurized gas line (not shown) can be connected with the port connector 36, 38.

The port connector 36, 38, shown in the connected mounted position, extends through a recess 44, 46 or hole (FIG. 4) formed in the first housing 4 and is attached in fluid communication with inlet port 32, 24 communicating with the brake piston(s) 10, so that the first housing 4 and second housing 31 cannot be rotated with respect to each other relative to the longitudinal axis A, so that a mechanical bayonet connection for locking the housings 4, 31 with respect to each other is provided. As can be seen in FIG. 1, each port connector 36, 38 has an outer thread 40, 42 and is screwed into the inlet port 32, 34 having an inner thread (not shown). Preferably, recess 44, 46 has a U-shaped edge. In an alternative embodiment, recesses 44, 46 can have different shapes such as a circular or rectangular hole or other shapes.

Figure 4:
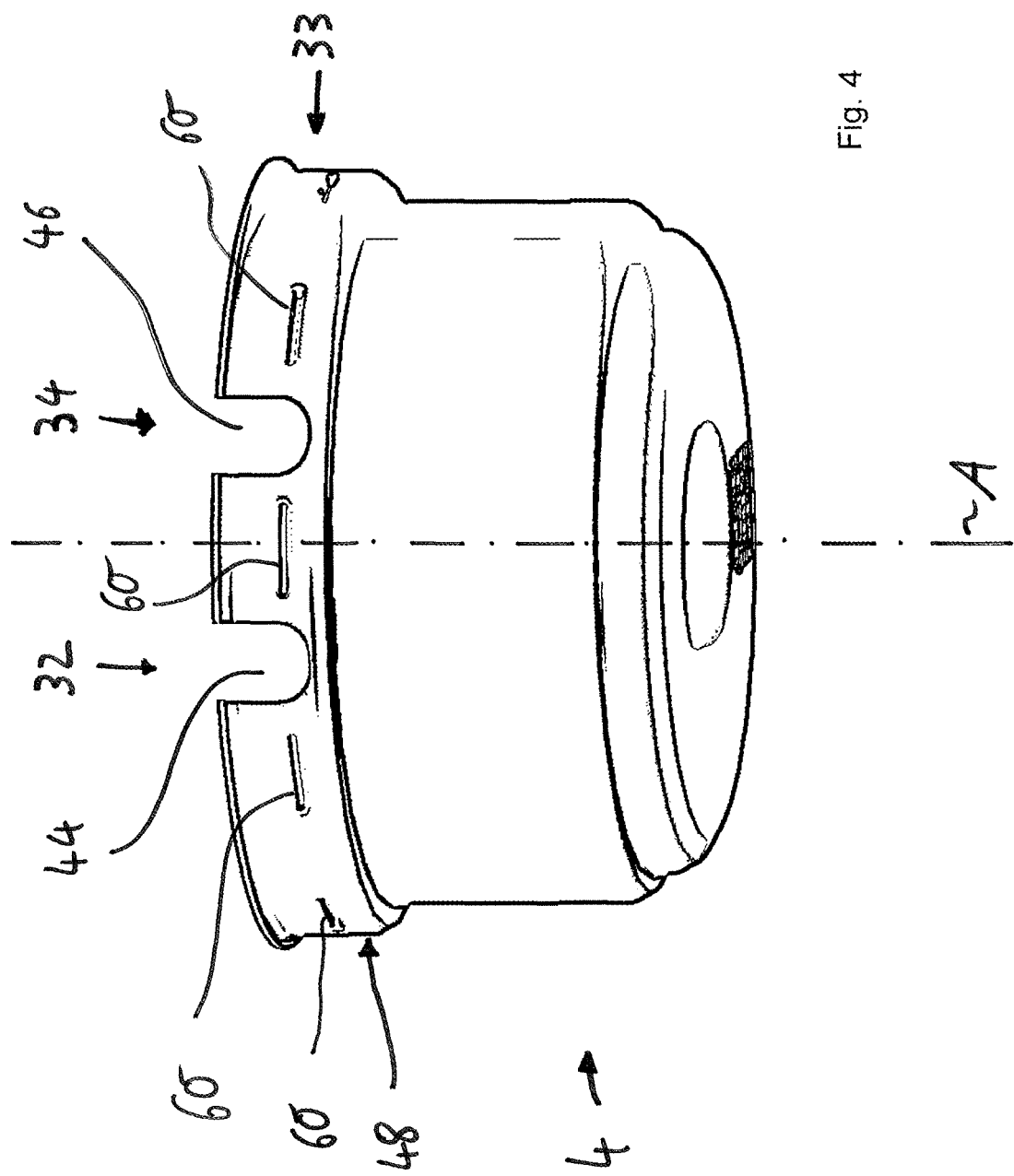
FIG. 4 is a perspective view of a cylindrical housing section of the spring brake actuator according to an aspect of the disclosure.

As can also be seen in FIG. 4, the inlet port(s) 32, 34 and/or recesses 44, 46 are positioned or formed on a protruding portion 48 of the first housing 4 extending radially outwardly and having a larger diameter than the adjacent lower portion (relative to FIG. 4) of the cylindrical housing 4.

As can be seen from FIG. 1-4, the mechanical connection section 33 includes connection part 50 for connecting the second housing 31 of the service brake section 27 and the first housing 4 of the parking brake section 11. Connection part 50 may, for example, be a cast or deep-drawn workpiece. The connection part 50 includes flange portion 18 with a radially outward projecting, and ring shaped, protrusion 52 (FIG. 2) which mechanically interacts, as shown in FIG. 3, with a lower (relative to FIG. 3) protruding portion 54 of the second housing 31 having a C-shaped cross-section, such that the second housing 31 can be connected with the connection part 50 by means of a form fit connection.

On a lower (with regard to FIGS. 2 and 3) radially outward projecting protrusion 56 of the connection part 50, a plurality of mechanical connection elements, preferably bayonet elements in the form of projections 58, are provided for forming a releasable connection with the first housing 4, preferably of a parking brake or the illustrated parking brake section 11 or a separate brake actuator. The bayonet elements, preferably in the form of projections 58 (or notches), are positioned along the circumference of the protrusion 56 of the connection part 50. Thus, the mechanical connection section 33 includes a bayonet connection having a plurality of bayonet connection elements 58. The gas inlet port(s) 32, 34 are positioned at least partially between the bayonet connection elements, preferably the projections 58, in the shown embodiment. As also becomes apparent in particular from FIG. 2, the gas inlet port(s) 32, 34 and the mechanical connection elements in the form of the bayonet projections 58 are essentially positioned along a circumferential circular line or band along the combined housing 4, 31, wherein the longitudinal axis A of the combined housing 4, 31 coincides with the center of the circumferential circular line or band. Such band is apparent in section having the axial length B shown in FIG. 2.

Figure 2:
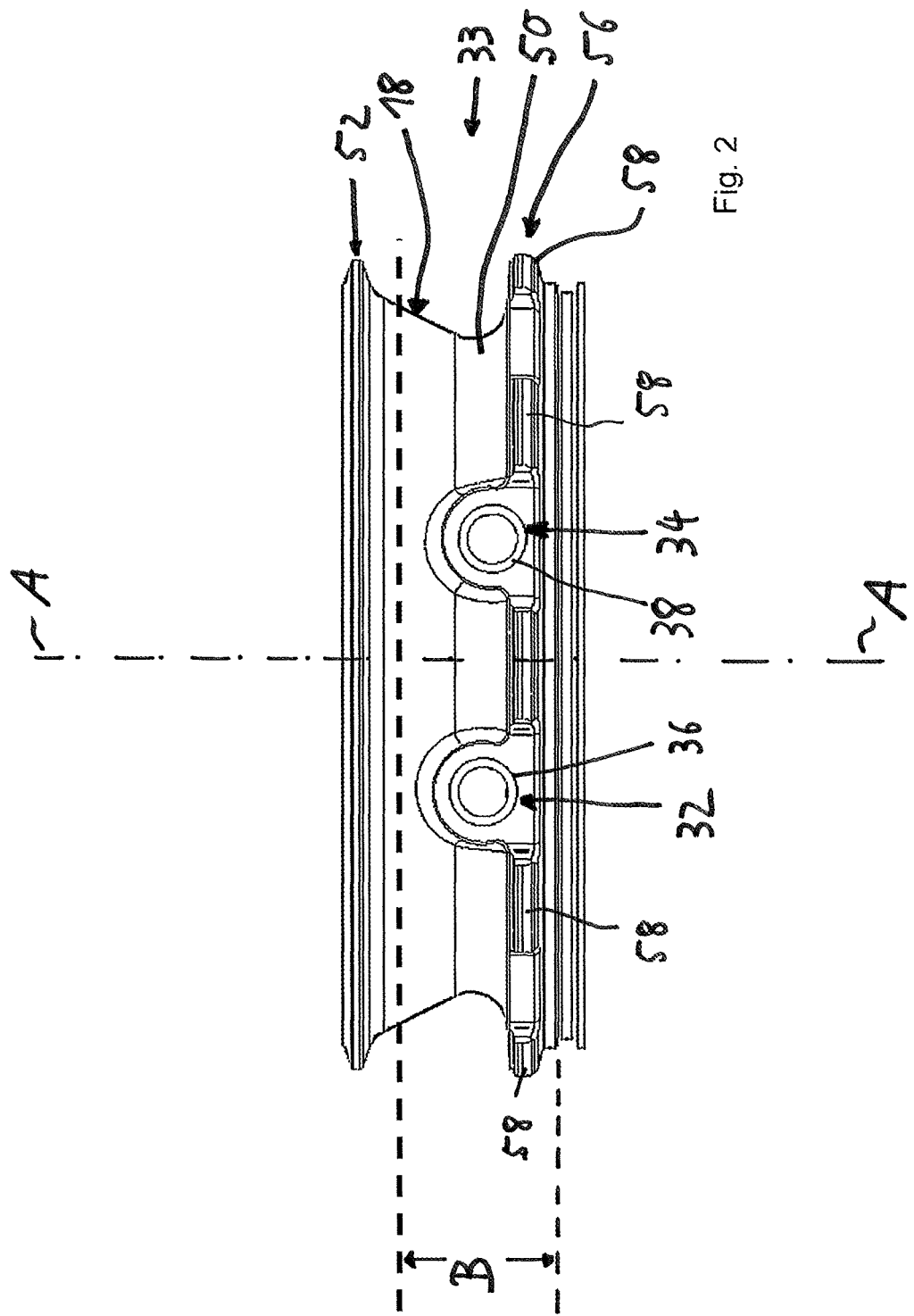
FIG. 2 is a partial view of the spring brake actuator of FIG. 1.

Bayonet elements can be formed on the first housing 4 or on the connection part 50 as shown in the embodiment in FIG. 2. On the first housing 4, the corresponding bayonet elements are formed as depressions, recesses, or slots 60 (FIG. 1 or FIG. 4) extending essentially in the circumferential direction along the housing 4 with respect to the longitudinal axis A. Thus, the first housing 4 is connected with second housing 31 via the connection part 50 by the bayonet connection elements. The bayonet connection elements are preferably projections 58 or notches formed on the connection part 50, or alternatively in the first housing and/or the second housing, whereas preferably recesses (in the preferred embodiment recesses 44, 46) are formed in the first housing 4 and/or second housing 31.

As shown, the projections 58, in the mounted state, extend at least partly into the depressions 60 formed in the first housing 4. For mounting together the components of the actuator 2, the first housing 4 can be rotated with respect to housing 31 and the connection part 50, so that the projections 58 come into form fit engagement with depressions 60. Once the mechanical bayonet connection is implemented in this manner and active, the port connectors 36, 38 are threaded in via the threads 40, 42 and, in this state, block a rotation of first housing 4 with respect to connection part 50 and thus with respect to second housing 31. Thus, the brake actuator 2 is secured by the mechanical connection. At the same time, pressurized gas can be introduced through the gas inlet ports 32, 34.

With reference to FIG. 3, different functional sections B-G and lengths of the individual sections B-G of the brake actuator 2 are described in more detail. Each section B-G has a certain axial length in the axial direction of the longitudinal axis A.

Section B includes both the mechanical connection section 33 and the gas inlet port section 35 and has a relatively short axial dimension as illustrated by B (FIG. 2). Section B includes the mechanical connection section 33 and gas inlet port section 35 as well as the connection part 50 and gas inlet ports 32 and 34 and port connectors 36, 38. Also, all bayonet connection elements in the form of the projections 58 (see also FIG. 2) as well as the corresponding bayonet connection elements in the form of depressions 60, formed within the protruding portion 48 of the housing 4, are provided within section B. The port connectors 36, 38, having the outer thread 40, 42, are mounted into the corresponding threads (not shown) formed within connection part 50. The port connectors 36, 38 and gas inlet ports 32 and 34 are each positioned between the projections 58 of the bayonet connection, with regard to the circumferential direction. Thus, no additional space is required into the axial direction (A), so that the length of section B is relatively small.

With reference to FIG. 3, section C illustrates a service brake connection area or a section for connecting the service brake (or service brake section) 27 to the housing 4 and the connection part 50 of the mechanical connection section 33. As can be seen in FIG. 3, a protruding portion 54 of the second housing 31 interacts in a form fit connection or relationship with the upper part (in FIG. 3) of connection part 50 and flange 18 having the ring shaped protrusion 52. Section C is adjacent to section B (above section B in FIG. 3).

Section D shows the service brake stroke and return spring area or section. It includes, amongst other elements, the service brake spring 30.

Section E is adjacent to section B (below section B in FIG. 3) and essentially defines the parking brake stroke area or section within the parking brake section 11 of the shown embodiment of the brake actuator 2. Section E is used to move the corresponding spring brake piston 10.

Section F essentially illustrates the parking brake storing area or section, within which the spring 8 of the parking brake section 11 is active.

Section G is adjacent to section F and essentially illustrates the release bolt or release rod 26 area.

Overall, the essential axial dimension of the shown embodiment of the spring brake actuator 2 is the sum of sections B-G. The overall length is reduced compared to other brake actuators 2, because the mechanical connection section 33 and the gas inlet ports 32, 34 as well as the corresponding port connections 36, 38 are essentially positioned within the same section in the axial direction along axis A. At the same time, they are positioned essentially around the radially outer or circumferential sections of the combined housing or housings 4, 31, together with the connection part 50, which can be regarded as part of the overall combined housing of the spring brake actuator 2.

LIST OF REFERENCES (PART OF SPECIFICATION)

2 spring brake actuator
4 first housing
5 pressure chamber
6 cylinder housing base
7 parking stroke area
8 compression spring
9 parking spring area
10 spring brake piston
11 parking brake section
18 flange portion
24 diaphragm
25 service brake pressure chamber
26 rod
27 service brake
28 service diaphragm
29 release bolt
30 service brake spring
31 second housing
32 gas inlet port
33 mechanical connection section
34 gas inlet port
35 gas inlet port section
36 port connector
38 port connector
40 thread
42 thread
44 recess
46 recess
48 protruding portion
50 connection part
52 protrusion
54 protruding portion
56 protrusion
58 projection
60 depression
A longitudinal axis
B section
C section
D section
E section
F section
G section

What is claimed is:

1. A spring brake actuator (2), preferably for use in a commercial vehicle, the actuator (2) comprising:
   a combined actuator housing (4, 31, 50) having an interior space for receiving components of the brake actuator,
   a brake piston (10) located in the actuator housing for generating a braking force and having a longitudinal axis (A),
   the combined actuator housing having a longitudinal axis that is coaxial with or is parallel to the longitudinal axis (A) of the piston,
   a spring located in the actuator housing for applying a braking force to the brake piston,
   a rod connected with the brake piston for transmitting the braking force,
   at least one gas inlet port (32, 34) associated with the actuator housing for supplying pressurized gas into the actuator housing and for applying pressure to the brake piston,
   the actuator housing having a mechanical connection section (33) including mechanical connection elements for forming a releasable coupling between a first housing (4) and a second housing (31) of the combined actuator housing (4, 31, 50),
   wherein the at least one gas inlet port and the mechanical connection section (33) are positioned along the circumference of the actuator housing within a gas inlet portion section (35) of the actuator (2) extending in the direction of the longitudinal axis (A);
   wherein a port connector (36, 38) for introducing pressurized gas is connected with the at least one gas inlet port formed within the combined actuator housing and protrudes radially from the combined actuator housing.

2. The spring brake actuator (2) according to claim 1, wherein the at least one gas inlet port and the mechanical connection elements are essentially positioned along a circumferential circular line or band along the circumference of the actuator housing, wherein the longitudinal axis of the actuator housing coincides with the center of the circumferential circular line or band.

3. The spring brake actuator (2) according to claim 1, wherein the mechanical connection section includes a bayonet connection having a plurality of bayonet connection elements, wherein the at least one gas inlet port is positioned between the bayonet connection elements.

4. The spring brake actuator (2) according to claim 3, wherein the bayonet connection elements are bayonet projections (58), wherein the at least one gas inlet port is positioned between the bayonet projections.

5. The spring brake actuator (2) according to claim 1, wherein the combined actuator housing includes recesses or holes (42, 44) forming the at least one gas inlet port, wherein the bayonet connection elements are positioned between the recesses or holes.

6. The spring brake actuator (2) according to claim 1, wherein the port connector, when connected with the at least one gas inlet port, extends through a recess or hole (44, 46) formed in the first housing (4) or the second housing (31), and the port connector is attached in fluid communication with the at least one gas inlet port communicating with the brake piston, such that the first housing (4) and the second housing (31) cannot be rotated with respect to each other relative to the longitudinal axis and the bayonet connection is blocked.

7. The spring brake actuator according to claim 1, wherein the port connector has an outer thread (40, 42) and is screwed into the at least one gas inlet port, which includes an inner thread.

8. The spring brake actuator (2) according to claim 1, wherein the at least one gas inlet port is formed through a first protruding portion (48) of the first housing (4) extending radially outwardly, wherein the bayonet elements are positioned between the protruding portion (48) of the first housing (4) and a protruding portion (54) of the second housing (31) extending radially outward.

9. The spring brake actuator (2) according to claim 8, wherein the bayonet elements are formed as projections (58) and the corresponding bayonet elements on the first housing (4) are formed as depressions (60) extending essentially in the circumferential direction with respect to the longitudinal axis.

10. The spring brake actuator (2) according to claim 1, wherein the first housing (4) is connected with the second housing (31) for a second brake actuator by bayonet connection elements, wherein the bayonet connection elements are projections (58) that cooperate with recesses (60) formed in the first housing (4).

11. The spring brake actuator (2) according to claim 1, wherein the first housing comprises (4) an essentially cylindrical shape, and the recesses of the bayonet section are formed in a cylindrical end section (48) having a larger diameter than the adjacent section of the first housing (4).

12. The spring brake actuator (2) according to claim 1, wherein the second housing (31) includes elements of a service brake including at least a spring, and the first housing (4) includes elements of a parking brake including a brake piston, a spring, and/or a release bolt.

13. The spring brake actuator (2) according to claim 1, further comprising a connection part (50) disposed in the mechanical connection section (33), the connection part (50) connecting the second housing (31) to the first housing (4).

14. The spring brake actuator (2) according to claim 13, wherein the connection part (50) includes first and second ring shaped protrusions (56, 52) at first and second ends thereof, wherein the first and second protrusions (56, 52) are configured to connect to the first and second housings (4, 31), respectively.

15. The spring brake actuator (2) according to claim 14, wherein the first ring shaped protrusion (56) of the connection part (50) includes the mechanical connection elements in the form of bayonet projections (58), wherein the bayonet projections are attached to corresponding bayonet elements formed in the first housing (4).

16. The spring brake actuator (2) according to claim 15, wherein the connection part (50) is rotatable relative to the first housing (4) to engage the bayonet projections with the corresponding bayonet elements, wherein the connection part (50) is blocked from rotation relative to the first housing (4) when a port connector (36, 38) is attached to the at least one gas inlet port (32, 34).

17. The spring brake actuator (2) according to claim 16, wherein the at least one gas inlet port (32, 34) is formed in the connection part (50), and the first housing (4) defines at least one recess or hole (44, 46) therethrough, wherein the at least one gas inlet port (32, 34) aligns with the at least one recess or hole (44, 46) when the bayonet connection is made.

18. The spring brake actuator of claim 14, wherein the second ring shape protrusion (52) is form fit with a radially outwardly protruding section (54) of the second housing (31).

19. The spring brake actuator of claim 18, wherein the protruding section (54) of the second housing (31) is C-shaped.

20. The spring brake actuator (2) according to claim 1,
wherein the at least one gas inlet port comprises first and second gas inlet ports (32, 34) of the gas inlet port section (35),
wherein the port connector (36) is a first port connector connected with the first gas inlet port, and a second port connector (38) is connected with the second gas inlet port formed within the combined actuator housing, the second port connector protruding radially from the combined actuator housing;
wherein the mechanical connection section includes a bayonet connection having a plurality of bayonet connection elements,
wherein the bayonet connection elements are bayonet projections (58),
wherein both the first and the second gas inlet ports (32, 34) of the gas inlet port section (35) and the mechanical connection section are positioned in a common axial extent,
wherein the mechanical connection section mechanically connects the first housing (4) and the second housing (31) within the common axial extent,
wherein the first and the second port connectors (36, 38) and the first and the second gas inlet ports (32, 34) are each positioned between the bayonet projections.

* * * * *